United States Patent
Ikemoto

(10) Patent No.: US 11,176,695 B2
(45) Date of Patent: Nov. 16, 2021

(54) SHAPE INFORMATION ACQUISITION APPARATUS AND SHAPE INFORMATION ACQUISITION METHOD

(71) Applicant: CANON KABUSHIKI KAISHA, Tokyo (JP)

(72) Inventor: Kiyokatsu Ikemoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/701,998

(22) Filed: Dec. 3, 2019

(65) Prior Publication Data
US 2020/0184665 A1 Jun. 11, 2020

(30) Foreign Application Priority Data
Dec. 11, 2018 (JP) .............................. JP2018-231940

(51) Int. Cl.
| | |
|---|---|
| *G06T 7/586* | (2017.01) |
| *G06T 7/73* | (2017.01) |
| *H04N 5/225* | (2006.01) |
| *G06T 7/521* | (2017.01) |
| *G01B 11/25* | (2006.01) |
| *G02F 1/1335* | (2006.01) |
| *G02F 1/13363* | (2006.01) |
| *G02F 1/1337* | (2006.01) |

(52) U.S. Cl.
CPC .......... *G06T 7/586* (2017.01); *G01B 11/2513* (2013.01); *G06T 7/521* (2017.01); *G06T 7/73* (2017.01); *H04N 5/2256* (2013.01); *G02F 1/1337* (2013.01); *G02F 1/13363* (2013.01); *G02F 1/133528* (2013.01); *G02F 1/133742* (2021.01); *G02F 2413/01* (2013.01)

(58) Field of Classification Search
CPC .......................... G06T 7/586; G01B 11/2513
See application file for complete search history.

(56) References Cited

U.S. PATENT DOCUMENTS

| | | | | |
|---|---|---|---|---|
| 5,499,098 A | * | 3/1996 | Ogawa | ..................... G01D 5/34 250/222.1 |
| 2009/0109215 A1 | * | 4/2009 | Fein | ..................... G03H 1/2249 345/419 |

(Continued)

OTHER PUBLICATIONS

Yasuyuki Matsushita, "Photometric Stereo", Information Processing Institute Research Report, vol. 2011-CVIM-177, No. 29, pp. 1-12, 2011.

*Primary Examiner* — Jerry T Jean Baptiste
(74) *Attorney, Agent, or Firm* — Cowan, Liebowitz & Latman, P.C.

(57) ABSTRACT

A shape information acquisition apparatus, comprises a memory and at least one processor and/or at least one circuit to perform operations of the following units. The acquiring unit is configured to acquire photometric images for which a subject is illuminated from different directions by an illuminance portion and a pattern projection image for which a predetermined light pattern is projected onto the subject by a projection portion. The detection unit configured to detect a position of the illuminance portion based on the pattern projection image. The shape calculation unit configured to calculate shape information for the subject based on the photometric images and the position of the illuminance portion.

24 Claims, 16 Drawing Sheets

(56) References Cited

U.S. PATENT DOCUMENTS

| | | | |
|---|---|---|---|
| 2015/0103144 A1* | 4/2015 | Shibazaki | H04N 13/204 348/46 |
| 2015/0373319 A1* | 12/2015 | Kinoshita | G01B 11/245 348/46 |
| 2017/0069091 A1* | 3/2017 | Hatada | G02B 27/126 |
| 2017/0343338 A1* | 11/2017 | Hamaguchi | G06T 7/521 |

* cited by examiner

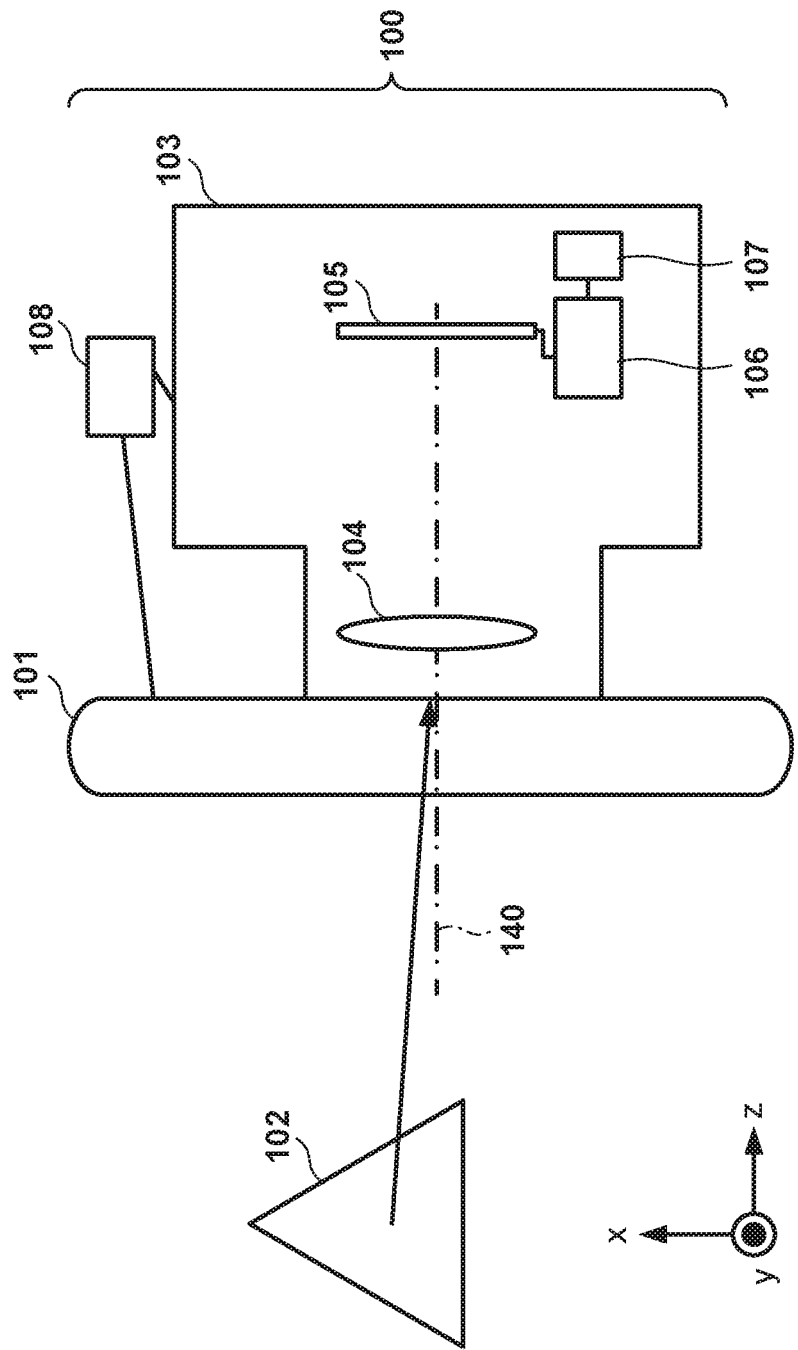

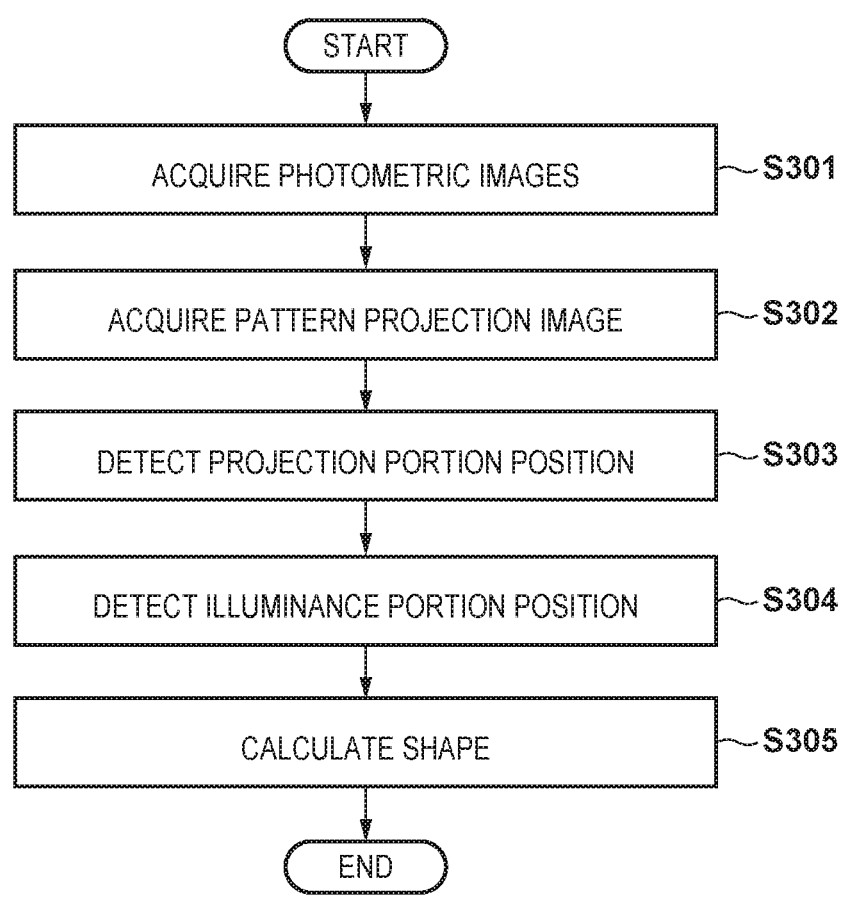

FIG. 4A
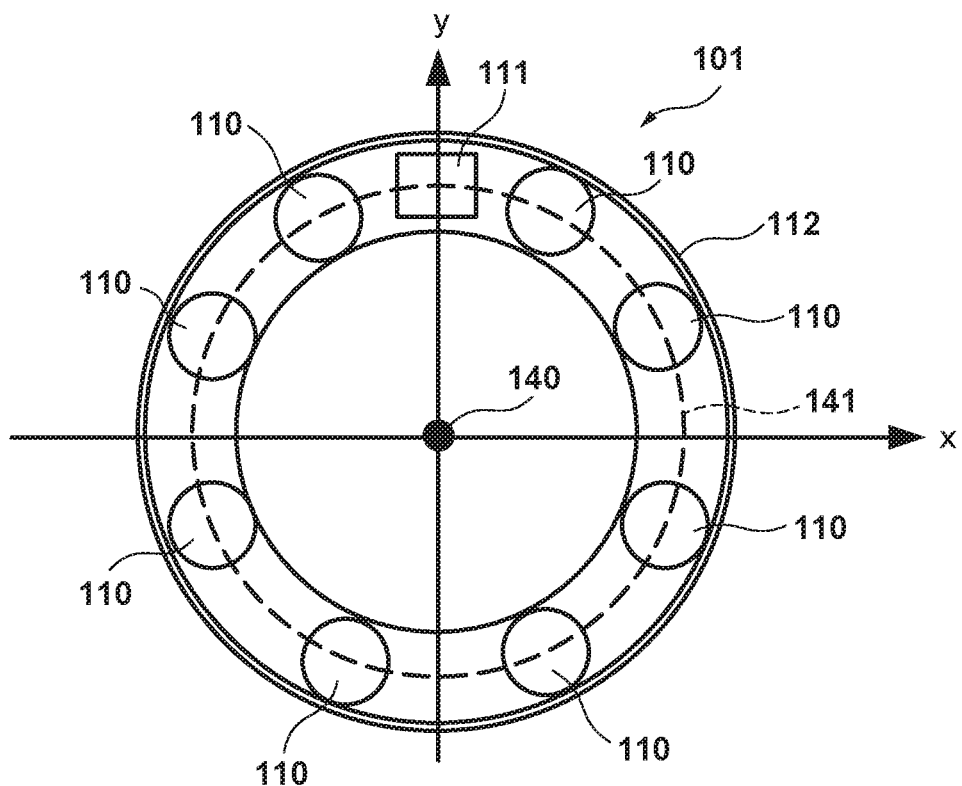
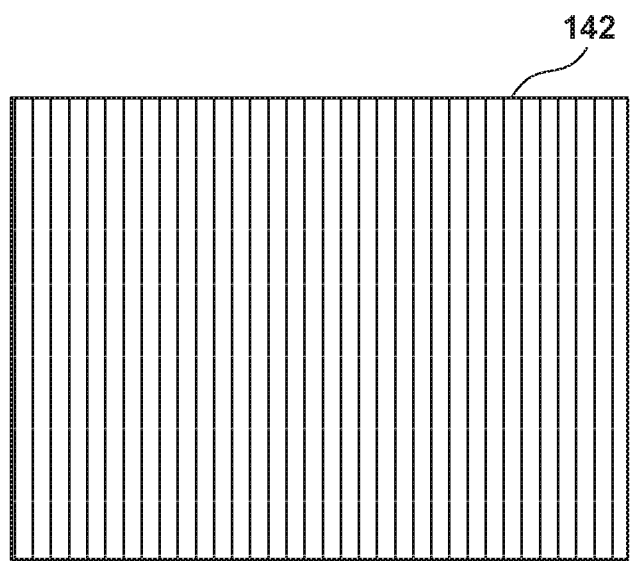

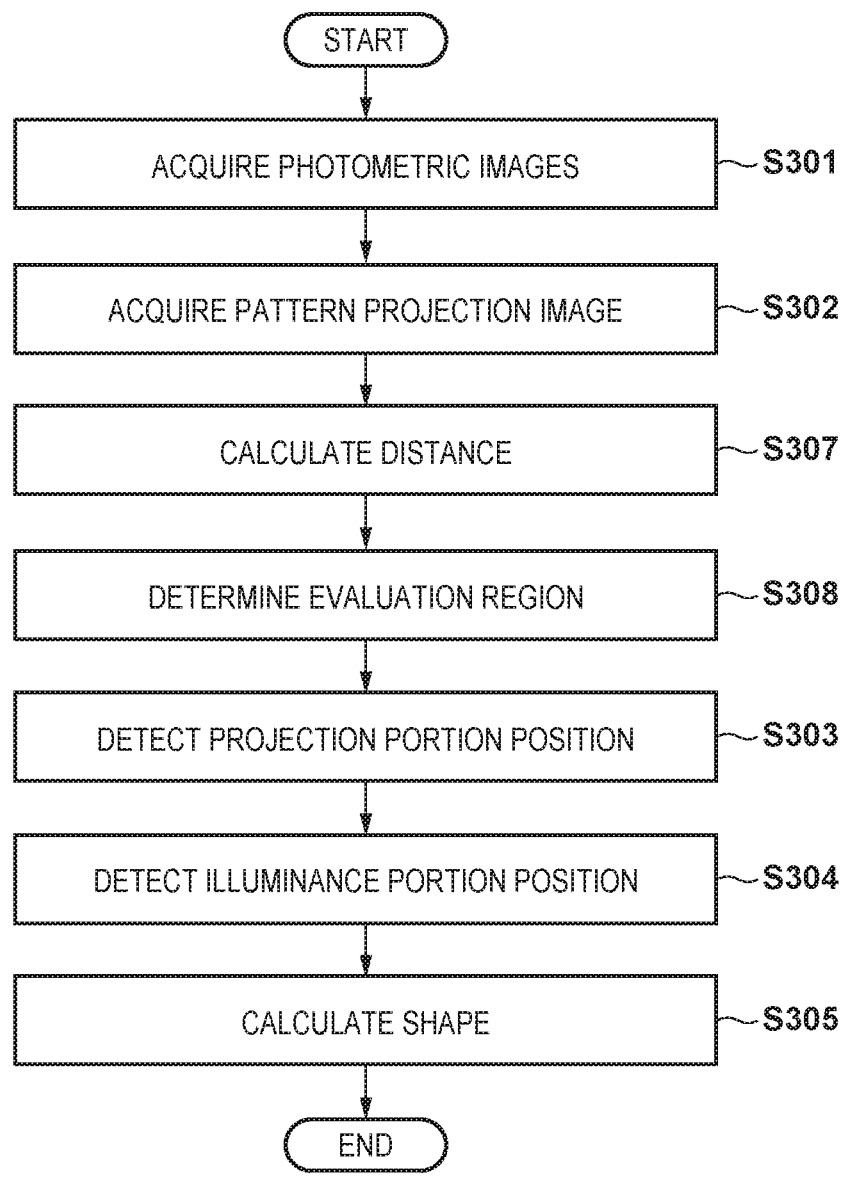

FIG. 5B
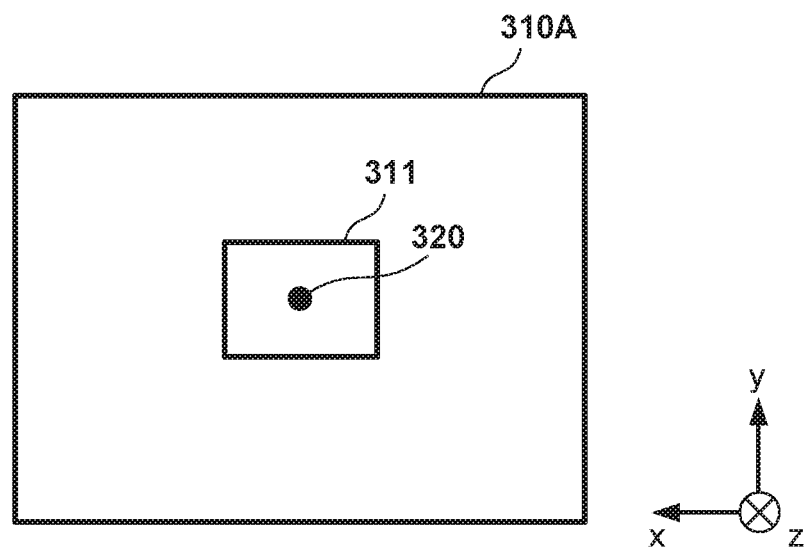
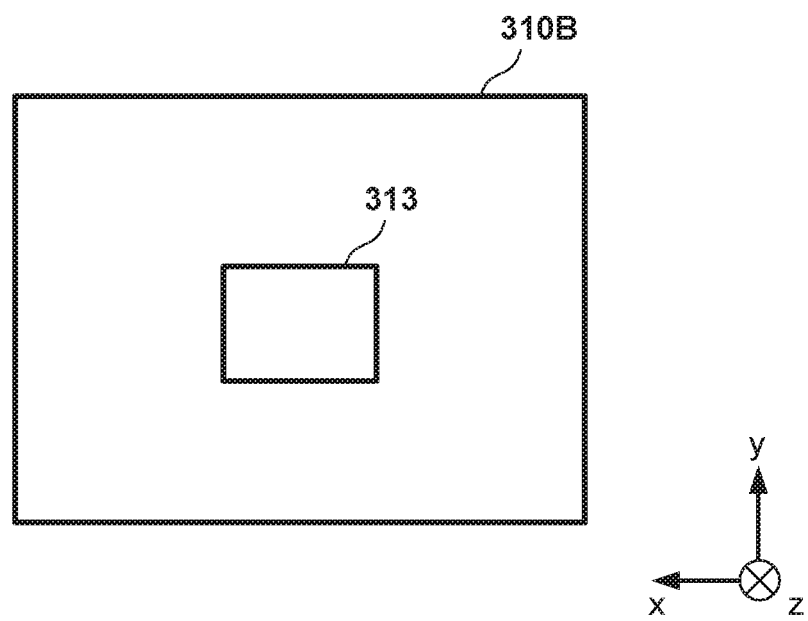

SHAPE INFORMATION ACQUISITION APPARATUS AND SHAPE INFORMATION ACQUISITION METHOD

BACKGROUND OF THE INVENTION

Field of the Invention

The present invention relates to a technique for acquiring shape information of an object.

Description of the Related Art

A photometric stereo method is known as a method for acquiring surface normal information of a subject (Yasuyuki Matsushita, "Photometric Stereo", Information Processing Institute Research Report, Vol. 2011-CVIM-177, No. 29, pp. 1-12, 2011). The photometric stereo method acquires a plurality of images by individually lighting a plurality of illuminance portions arranged at different positions and illuminating and capturing a subject from different directions. Then, for example, in the case of using the photometric stereo method, surface normal information of the subject can be calculated based on the illumination direction of each illuminance portion and the luminance information of the image for each illuminance portion.

The surface normal information acquired by the photometric stereo method can be used for image processing, for example. An image equivalent to an image captured under environmental light different from that at the time of capturing can be reproduced by image processing using shape information such as surface normal information and information on a light source position and a light amount of environmental light.

When the surface normal information is calculated using the illumination direction information and the luminance information of each illuminance portion as in the photometric stereo method, if a deviation occurs from a predetermined position due to a deviation at the time of installation of the illuminance portion or a change over time, a deviation also occurs in the illumination direction, and thus a calculation error also occurs in the surface normal information.

SUMMARY OF THE INVENTION

The present invention has been made in consideration of the aforementioned problems, and realizes techniques by which it is possible to reduce a shape information calculation error and acquire higher precision shape information.

In order to solve the aforementioned problems, the present invention provides a shape information acquisition apparatus, comprising: a memory and at least one processor and/or at least one circuit to perform operations of the following units: an acquiring unit configured to acquire photometric images for which a subject is illuminated from different directions by an illuminance portion and a pattern projection image for which a predetermined light pattern is projected onto the subject by a projection portion; a detection unit configured to detect a position of the illuminance portion based on the pattern projection image; and a shape calculation unit configured to calculate shape information for the subject based on the photometric images and the position of the illuminance portion.

In order to solve the aforementioned problems, the present invention provides a shape information acquisition apparatus comprising: a memory and at least one processor and/or at least one circuit to perform operations of the following units: an acquisition unit configured to acquire polarization images for which a direction of transmission through a polarization element differs and a pattern projection image obtained by projecting a predetermined light pattern onto a subject by a projection portion; a detection unit configured to detect the direction of transmission based on the pattern projection image; and a shape calculation unit configured to calculate shape information for the subject based on the polarization images and the directions of transmission.

In order to solve the aforementioned problems, the present invention provides a shape information acquisition method of an apparatus in which photometric images for which a subject is illuminated from different directions by an illuminance portion and a pattern projection image for which a predetermined light pattern is projected onto the subject by a projection portion are acquired, the method comprising: detecting a position of the illuminance portion based on the pattern projection image; and calculating shape information for the subject based on the photometric images and the position of the illuminance portion.

In order to solve the aforementioned problems, the present invention provides a shape information acquisition method of an apparatus in which polarization images having different directions of transmission through a polarization element and a pattern projection image obtained by projecting a predetermined light pattern onto a subject by a projection portion are acquired, the method comprising: detecting a direction of the transmission based on the pattern projection image; and calculating shape information for the subject based on the polarization image and the direction of the transmission.

In order to solve the aforementioned problems, the present invention provides a non-transitory computer-readable storage medium storing a program that causes a computer to execute a shape information acquisition method of an apparatus in which photometric images for which a subject is illuminated from different directions by an illuminance portion and a pattern projection image for which a predetermined light pattern is projected onto the subject by a projection portion are acquired, the method comprising: detecting a position of the illuminance portion based on the pattern projection image; and calculating shape information for the subject based on the photometric images and the position of the illuminance portion.

In order to solve the aforementioned problems, the present invention provides a non-transitory computer-readable storage medium storing a program that causes a computer to execute a shape information acquisition method of an apparatus in which polarization images having different directions of transmission through a polarization element and a pattern projection image obtained by projecting a predetermined light pattern onto a subject by a projection portion are acquired, the method comprising: detecting a direction of the transmission based on the pattern projection image; and calculating shape information for the subject based on the polarization image and the direction of the transmission.

Even when the position of the illuminance portion is shifted, error in calculating shape information can be reduced, and high precision shape information can be acquired.

Further features of the present invention will become apparent from the following description of exemplary embodiments (with reference to the attached drawings).

BRIEF DESCRIPTION OF THE DRAWINGS

FIGS. 1A to 1C are block diagrams that schematically illustrate an exemplary configuration of a device according to a first embodiment.

FIG. 3 is a flowchart illustrating an example of shape information acquisition processing according to the first embodiment.

FIGS. 4A to 4C are diagrams illustrating an exemplary shape calculation method of the first embodiment.

FIGS. 5A and 5B are diagrams illustrating an example of another shape information acquisition process of the first embodiment.

DESCRIPTION OF THE EMBODIMENTS

Figure 1B:
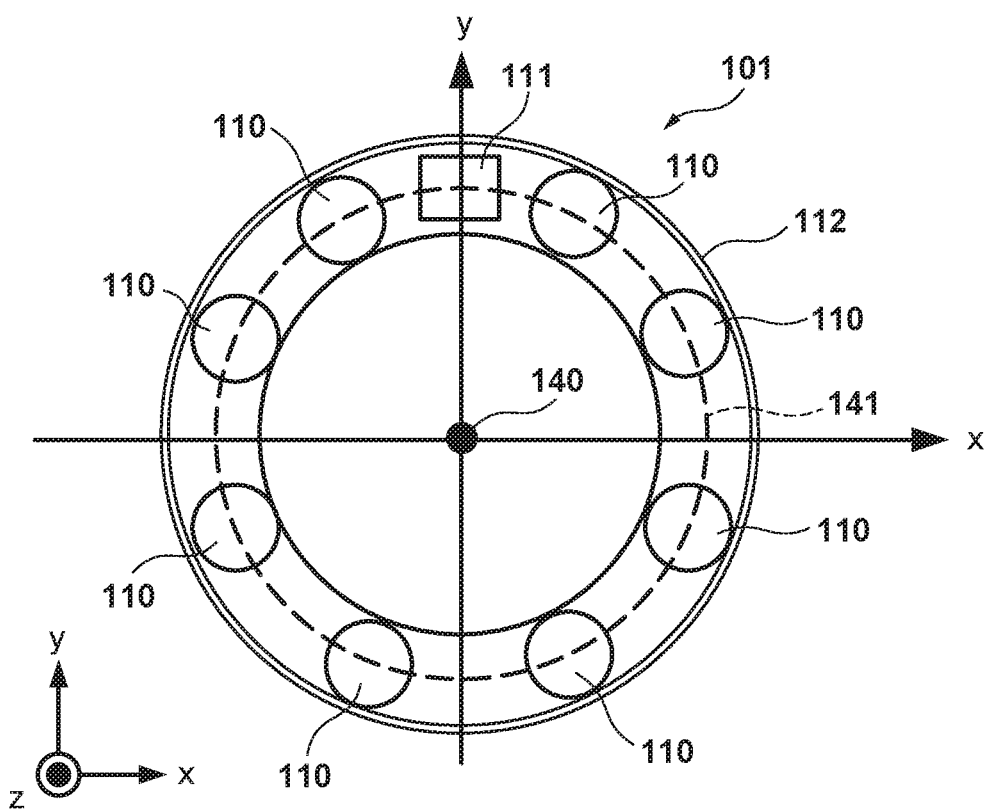

Hereinafter, embodiments for carrying out the present invention will be described in detail. The embodiments described below are examples of implementations of the present invention, and should be appropriately modified or changed depending on the configuration and various conditions of the device to which the present invention is to be applied, and the present invention is not limited to the embodiments described below. In addition, parts of the embodiments described below may be combined as appropriate.

First Embodiment

Hereinafter, a first embodiment will be described.
<Device Configuration>
First, referring to FIGS. 1A to 1C, the configuration and function of a shape information acquisition apparatus according to the first embodiment will be described.

A shape information acquisition apparatus 100 according to the first embodiment illuminates a subject 102 by an illumination device 101, and performs capturing by an image capture device 103. The image capture device 103 includes an imaging optical system 104, an image sensor 105, a CPU (a calculation processing unit) 106, and a built-in memory 107. The illumination device 101 and the image capture device 103 are connected to a control unit 108, and operations of the respective devices are controlled in synchronization with each other. The control unit 108 controls each component of the device. In addition, the CPU of the control unit 108 reads a program stored in the built-in memory and executes processing of flowcharts described later.

The illumination device 101 includes a plurality of illuminance portions 110, a projection portion 111, and an attachment portion 112 for attaching the illuminance portions 110 and the projection portion 111 to the image capture device 103. The plurality of illuminance portions 110 are configured to be able to illuminate a subject from different positions (directions) by the light source of each illuminance portion 110. A plurality of illuminance portions 110 are arranged rotationally symmetrically on a circumference centered on the optical axis of the imaging optical system 104. Note that, when the photometric stereo method is performed, at least three illumination directions are required, and therefore, it is sufficient that three or more illuminance portions 110 be provided. In the present embodiment, the plurality of illuminance portions 110 are arranged rotationally symmetrically on the circumference centered on the optical axis of the imaging optical system 104, but they need not necessarily be arranged rotationally symmetrically, and may be arranged asymmetrically. In addition, the intervals of the adjacent illuminance portions 110 need not be equal and may be unequal. Illuminance portions 110 may be disposed without a gap therebetween.

A projection portion 111 is configured to be capable of irradiating a subject with a light pattern whose luminance changes spatially. The projection portion 111 can be composed of a light source such as an LED (Light Emitting Diode), imaging lenses, and a pattern mask in which a pattern is formed on ground glass, a metal plate, or the like. That is preferable in view of reduction of the device cost and miniaturization of the device. FIG. 1C illustrates a light pattern which can be projected in the present embodiment. A light pattern 109 is a line light pattern having a linear form (line-shaped) luminance region in which a high luminance region exceeding a predetermined luminance value and a low luminance region less than or equal to a predetermined luminance value are alternately repeated in the x axis direction and that is long in the y axis direction. Note that the projection portion 111 need not be disposed on the same circumference as the illuminance portions 110, and may be disposed at a different distance.

The attachment portion 112 is a member for attaching the illumination device 101 (the illuminance portions 110 and the projection portion 111) to the image capture device 103 or capture assisting equipment (not illustrated) such as a tripod. The illuminance portion 110 and the projection portion 1 may be configured so as to be a single body with the attachment portion 112, and may be configured to be detachable. The attachment portion 112 may be configured to be a single body with the image capture device 103 or the capture assisting equipment, and may be configured to be detachable.

Figure 1C:
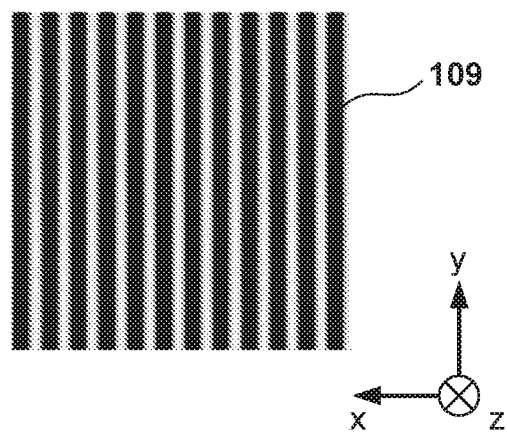

A positional relationship between the illuminance portions 110 and the projection portion 111 is a positional relationship in a circumference 141 equidistant from an optical axis 140 in a plane perpendicular to the optical axis 140 of the imaging optical system 104 as illustrated in FIG. 1B. The positions of the illuminance portions 110 and the position of the projection portion 111 when the illumination device 101 is installed at a predetermined position are referred to as base positions. The position of the illumination device 101 at this time is referred to as a base attachment position. In the present embodiment, as illustrated in FIG. 1B, a position of the illumination device 101 when the illumination device 101 is installed such that the projection portion 111 is at the top position when the illumination device 101 is viewed from the front is set as the base attachment position, and the respective positions of the projection portion 111 and the illuminance portions 110 are set as base positions. Base position information of the illuminance portion 110 and the projection portion 111 is recorded in the built-in memory 107 or a memory provided in the illumination device 101.

The imaging optical system 104 has a function of forming an image of a subject on the image sensor 105 which is a capture surface. The imaging optical system 104 includes a plurality of lens groups (not illustrated) and a diaphragm (not illustrated), and has an exit pupil 130 at a position apart from the image sensor 105 by a predetermined distance. Note that reference numeral 140 in FIG. 1A indicates the optical axis of the imaging optical system 104, and in the present embodiment, the optical axis 140 is parallel to the z axis. Further, the x axis and the y axis are orthogonal to each other, and are axes perpendicular to the optical axis.

Figure 2A:
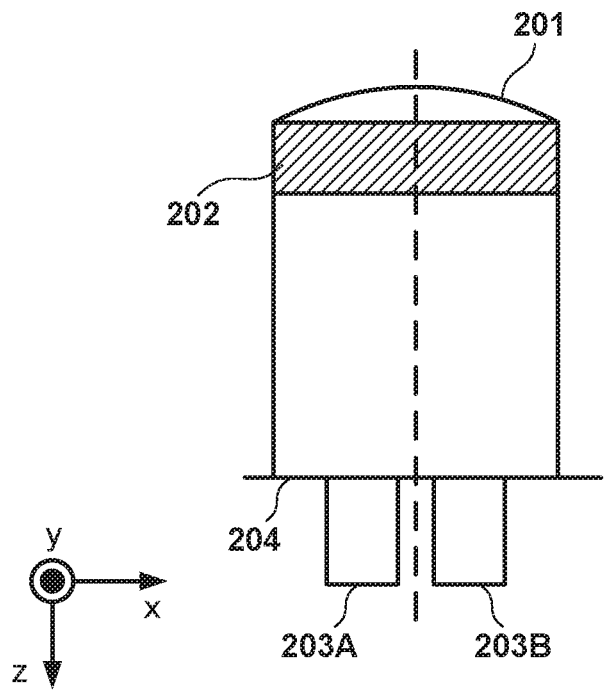
FIGS. 2A and 2B are schematic diagrams that illustrate an exemplary configuration of an image sensor according to the first embodiment.

A plurality of pixels are arranged in the image sensor 105, and the pixels include a microlens 201, a color filter 202, and photoelectric conversion portions 203A and 203B as illustrated in a cross-sectional view in FIG. 2A. The image sensor 105 is provided with RGB (Red, Green, Blue) spectral characteristics corresponding to wavelength bands detected by the color filters 202 of the respective pixels, and is arranged two-dimensionally in the xy plane by a known color arrangement pattern such as a Bayer pattern. On a substrate 204, a photoelectric conversion portion having sensitivity to a wavelength band to be detected is formed. Each pixel is provided with a wiring (not illustrated).

Figure 2B:
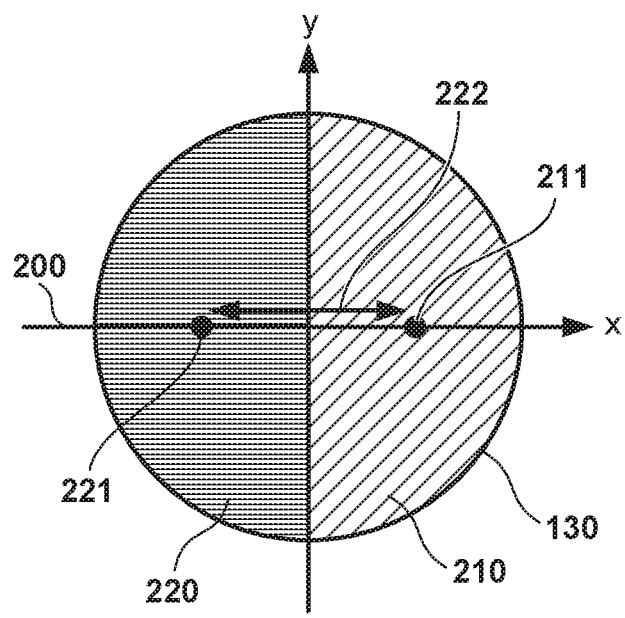

FIG. 2B is a view in which the exit pupil 130 of the imaging optical system 104 is viewed from the intersection point (central image height) between the optical axis 140 and the image sensor 105. A first light flux passing through the first pupil region 210 and a second light flux passing through the second pupil region 220, which are different regions of the exit pupil 130, enter the photoelectric conversion portion 203A and the photoelectric conversion portion 203B, respectively. The A image and the B image are generated by photoelectrically converting the light flux incident on the photoelectric conversion portion 203A and the photoelectric conversion portion 203B, respectively. An acquired A image and B image are sent to the calculation processing unit 106, and distance information is calculated by predetermined distance calculation processing, and stored in the built-in memory 107. An image obtained by adding the A image and the B image can be used as image information.

FIG. 2B illustrates a center of gravity position (a first center of gravity position) 211 of the first pupil region 210 and a center of gravity position (a second center of gravity position) 221 of the second pupil region 220, respectively. In the present embodiment, the first center of gravity position 221 is offset (displaced) along a first axis 200 from the center of the exit pupil 130. On the other hand, the second center of gravity position 221 is offset (displaced) along the first axis 200 in a direction opposite to the first center of gravity position 211. A direction connecting the first center of gravity position 211 and the second center of gravity position 221 is referred to as a pupil division direction. The distance between the center of gravity positions 211 and 221 is a base length 222. A position shift of the A image and the B image occurs in the same direction (the x axis direction in the present embodiment) as the pupil division direction due to defocus. The relative position displacement amount between the images, that is, the parallax amount between the A image and the B image is an amount corresponding to the defocus amount. Therefore, this parallax amount can be acquired by a method described later, and the parallax amount can be converted into a defocus amount or a distance by a known conversion method.

(Shape Calculation Using Photometric Images)

In the present embodiment, by using the photometric stereo method, it is possible to acquire surface normal information of the subject based on a plurality of photometric images with different illuminance acquired by the image capture device 103 after individually turning on/off (lighting/unlighting) the illuminance portions 110.

The photometric stereo method is a method of calculating surface normal information from reflection characteristics that are assumed to be luminance information of a subject acquired by assuming reflection characteristics based on an illumination direction with respect to a subject and a surface normal of the subject, illuminating from a plurality of light source positions, and capturing. As the reflection characteristic, for example, a Lambertian reflectance model according to Lambert's cosine law can be used. The luminance information may be obtained by capturing images of each subject when the light source is on and off, and taking the difference between them, thereby eliminating the influence of light sources other than environmental light and the like.

Hereinafter, description will be given of a case where reflection characteristics in the Lambertian reflectance model are assumed. Let respective components of M different (M≥3) light source vectors (unit vectors indicating directions from the object to the light source) be $s_1$, $s_2$, ..., $s_M$, and luminance values for the respective components of the light source vectors be $i_1$, $i_2$, ..., $i_M$. Assuming that the Lambertian diffuse reflectance is $\rho_d$, the intensity of incident light is E, the unit vector indicating the direction from the object to the light source, and the unit surface normal vector of the object is n, the following relationship of Equation 1 is satisfied.

$$E\rho_d n = S^{-1} \begin{bmatrix} i_1 \\ \vdots \\ i_M \end{bmatrix} \qquad \text{(Equation 1)}$$

When $E\rho_d$ is regarded as a single variable. Equation 1 can be regarded as simultaneous equations for determining three unknown variables together with two degrees of freedom of the unit surface normal vector n. Therefore, by acquiring the luminance information using at least three light sources, each variable can be determined. Note that when M>3, there are more conditional expressions than the number of unknown variables to be calculated, and therefore, the unit surface normal vector n may be calculated from three arbitrarily selected conditional expressions by the same method as in the case of M=3. Alternatively, the unit surface normal vector n may be calculated by a fitting method or an optimization method.

When the reflection characteristics of the subject is assumed by a model different from the Lambertian reflectance model, the conditional expressions may be different from the linear equations for each component of the unit surface normal vector n. In such cases, if there are more conditional expression than the number of unknown variable, a fitting method or an optimization method can be used.

<Shape Information Acquisition Processing>

Next, with reference to FIG. 3, shape information acquisition processing of the first embodiment will be described.

Note, the processing of FIG. 3 is realized by the control unit 108 executing a program stored in the built-in memory 107 and controlling respective units. The same applies to FIGS. 5A and 5B, FIGS. 6A to 6C, and FIG. 8, which will be described later.

In step S301 ("photometric image acquisition"), a plurality of illuminance portions 110 are individually lighted, thereby illuminating a subject from different directions, and capturing the illuminated subject from respective directions to acquire photometric images. Specifically, light from at least three illuminance portions 110 at different positions is sequentially irradiated, and a subject captured by the image capture device 103, and the captured images are recorded in the built-in memory 107. The control unit 108 controls the operation and the timing of the illuminance portions 110 and the image capture device 103 in order to perform capturing in a state of illumination from each illuminance portion 110.

In step S302 ("pattern projection image acquisition"), a pattern projection image is acquired by capturing the subject in a state in which a light pattern is projected by the image capture device 103. The projection portion 111 generates the light pattern 109, and irradiates the subject with the light pattern 109. In a pattern projection image is acquired by capturing in this state, and the pattern projection image are accumulated in the built-in memory 107. The control unit 108 controls the operation and the timing of the projection portion 111 and the image capture device 103 in order to perform capturing in a state in which such a light pattern projection has been performed.

Figure 4B:
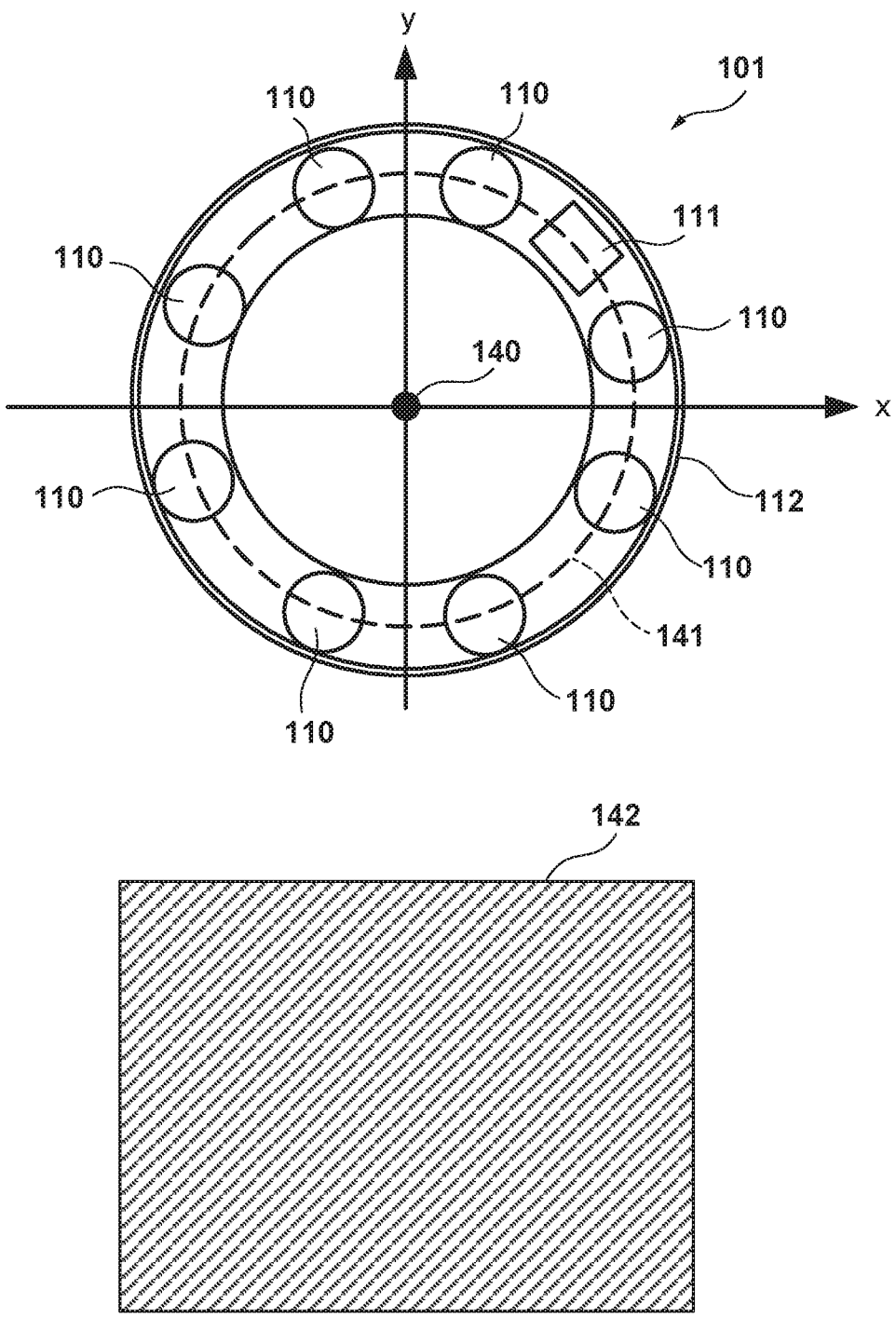
Figure 4C:
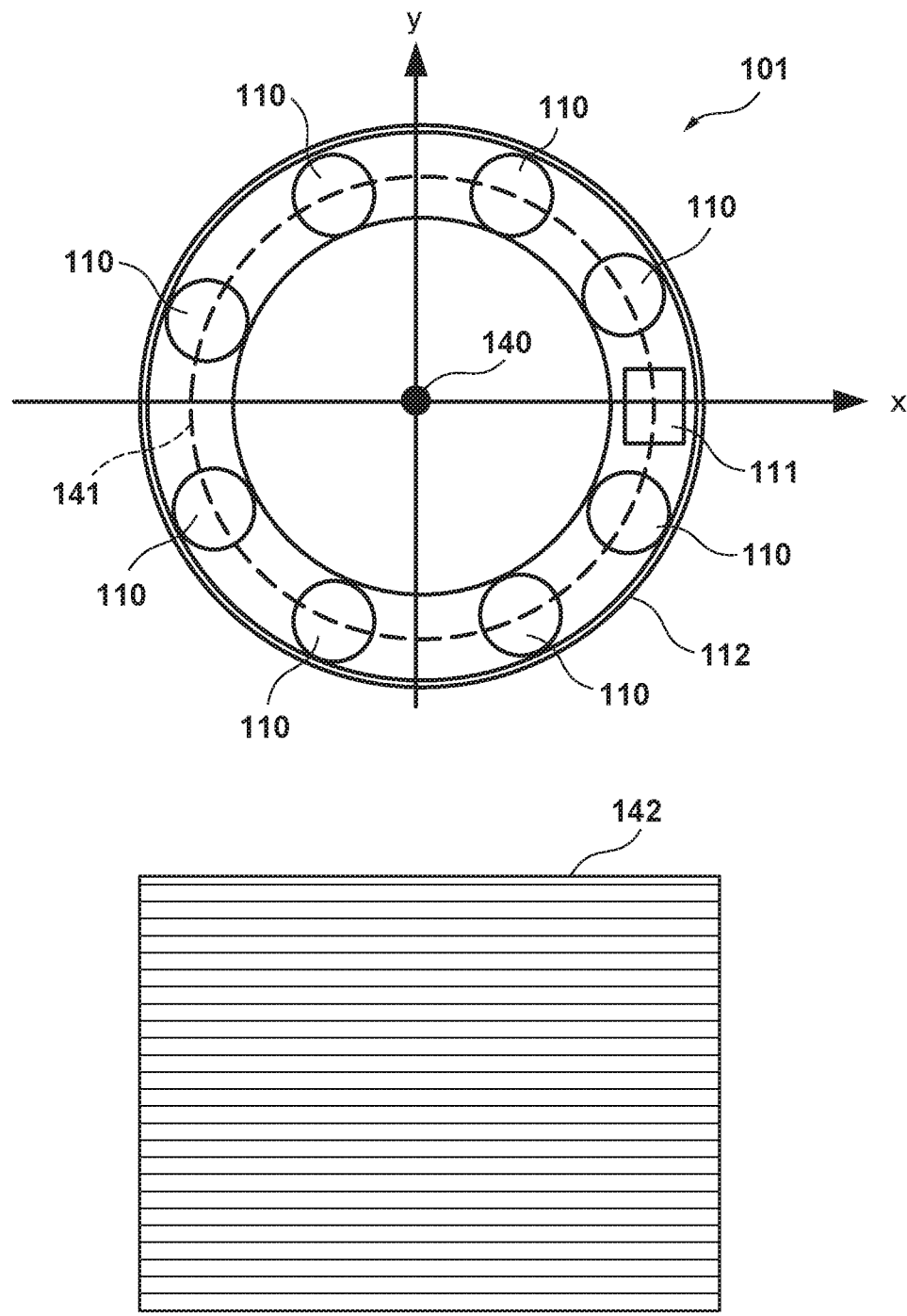

In step S303 ("projection portion position detection"), the calculation processing unit 106 detects the position of the projection portion 111 using the pattern projection image. The direction of the line pattern in the pattern projection image changes according to the position on the circumference of the projection portion 111. FIGS. 4A to 4C illustrate examples of installations of the illumination device 101 and examples of pattern projection images 142. FIGS. 4A to 4C illustrate the illumination device 101 when the projection portion 111 is positioned in the 0 degree direction, the 45 degree direction, and the 90 degree direction, respectively, and projection images 142 when patterns are projected from the respective positions onto a plane. When the projection portion is at each position, the line pattern of the projection image 142 is a pattern extending in a vertical direction, a diagonal 45 degree direction, and a horizontal direction, respectively. Using this, the direction of the line pattern in the projection image 142 is detected, and the position of the projection portion 111 is detected. First, edges included in the pattern projection image are detected. A known edge detection method can be used. For example, by applying a differential filter such as a Sobel filter to the pattern projection image, differential images in the horizontal direction and the vertical direction are generated, and a region where the differential value is larger than a predetermined value is detected as an edge. Next, the direction of an edge is detected by calculating the ratio between the differential image of the horizontal component and the differential image of the vertical component. Information on the relationship between the direction of the pattern and the position of the projection portion is held in advance, and the position of the projection portion 111 is detected by collating the information with the direction of the detected pattern.

In step S304 ("illuminance portion position detection"), the calculation processing unit 106 detects the position of the illuminance portion 110 based on the position information of the projection portion 111 obtained in step S303. Base position information for the projection portion 111 and the illuminance portions 110 is recorded in advance, and the position of each illuminance portion 110 can be calculated by calculating the movement amount from the difference between the detected position of the projection portion 111 and the base position (in the present embodiment, the top position) and adding the calculated movement amount to the base position of the illuminance portion 110.

In step S305 ("shape calculation"), the calculation processing unit 106 calculates the shape information by the above-described known method. The illumination directions at the times of capturing the respective photometric images can be obtained from the position information of the respective illuminance portion 110 obtained in step S304. From each illumination direction and luminance value of the photometric images, surface normal information, which is shape information, can be calculated.

By the shape information acquisition processing described above, even when the illumination device is attached at a different position that is shifted from the base attachment position, the position information of each illuminance portion can be acquired, and high precision shape information can be acquired.

(Method of Detecting Pattern Direction)

In step S303 ("projection portion position detection"), it is also possible to extract a region in which the change amount of the direction of the edge is smaller than a predetermined threshold in the pattern projection image, that is, a region in which the linearity of an edge is within a predetermined error range (a region with high linearity), and to detect the direction of the pattern using the image of this region. For example, the differential image of the horizontal component and the differential image of the vertical component are calculated by the above-described method, and an edge direction image representing the distribution of edge directions is generated by taking a ratio between them. By selecting a region having a uniform value in the edge direction image, a region having a high linearity can be detected. When the light pattern is projected onto a boundary of an object or an unevenness of an object where there are different distances, the shape of the light pattern is distorted by the change in distance, so that the direction cannot be correctly detected. By using such a method, it is possible to detect the direction of the pattern in a region in which an amount of change in distance is smaller than a predetermined threshold in a subject region in the capturing region, and it is possible to detect the direction with high precision and detect the position of the projection portion.

In the position detection of the projection portion 111, an image without pattern projection may be acquired, and a difference or ratio between the image and the pattern projection image may be obtained to generate a pattern emphasized image. An image without pattern projection can be acquired by, for example, turning off the projection portion 111 and capturing an image. Alternatively, part of the photometric images or an average image of all the images may be used. When the direction of the pattern is detected, if the subject has a pattern, the directions of a plurality of edges in addition to the directions of the edges of the projection pattern will be detected, which results in detection error. By using such a pattern emphasized image, it is possible to reduce the influence of a texture of the subject, it is possible to detect the direction of the pattern of the pattern projection image with higher precision, and it is possible to detect the position of the projection portion with higher precision.

Although a method using differential filters has been described in step S303 ("projection portion position detection"), other methods may be used. For example, the image may be subjected to a Hough transform for the straight line detection and to obtain a straight line direction. Alternatively, known pattern matching may be used. A base image is prepared in advance. As the base image, an image captured by projecting a pattern onto a plane or an image acquired by converting a transmittance distribution of a mask pattern configuring a projection portion into an image can be used. Alternatively, when an LCOS (Liquid Crystal On Silicon) of a projection portion, a DMD (Digital Micromirror Device), or the like is used, an original image or the like used for pattern projection can be used. The base image and the acquired pattern projection image are relatively rotated to calculate a correlation value, and the rotation direction having the highest correlation can be detected as the direction of the pattern. By using such a method, the projection pattern is not limited to the line pattern, and an arbitrary pattern can be used.

(Projection Portion Position Detection Method Using Distance Information)

By using distance information in the "projection portion position detection" of step S303, the position of the projection portion can be detected with higher precision. FIG. 5A illustrates shape information acquisition processing using the distance information.

Step S301 ("photometric image acquisition") is similar to step S301 of FIG. 3.

In step S302 ("pattern projection image acquisition"), a pattern projection image is acquired similarly to step S302 of FIG. 3. An image pair composed of an A image and a B image, which are pattern projection images having parallax, is acquired by capturing in a state in which a light pattern is projected onto a subject, and the image pair is stored in the built-in memory 107. When there is not much of a pattern (also referred to as a texture) of the subject 102, if the light pattern projection from the projection portion 111 is not used and the capture is performed under only the ambient environment light, the contrast and S/N ratio of the A image and the B image will be lower, and the precision of the distance calculation by the correlation calculation will be lower. For this reason, the distance calculation precision is improved by performing the projection of the light pattern from the projection portion 111 and performing the capture in a state in which a texture is superimposed on the surface of the subject 102.

In step S307 ("distance calculation"), the calculation processing unit 106 calculates the distance information of the subject using the pattern projection image acquired in step S302.

Here, the positional relation between the base image and the reference image will be described with reference to FIG. 5B. Reference numeral 310A denotes an A image, and reference numeral 310B denotes a B image. First, the correlation values of the A image and the B image are calculated. In the A image, a pixel 320 to be subjected to distance calculation processing (referred to as a target pixel) and a partial region including its neighboring pixels are extracted and used as a base image 311. Next, a region having the same surface area as that of the base image is extracted from the B image to obtain a reference image 313. The position from which the reference image is extracted in the B image is moved in x axis direction which is the same as the pupil division direction, and a correlation value between the reference image and the base image for each movement amount is calculated, thereby calculating correlation values configured by a data string of the correlation values for respective movement amounts. The direction in which the reference image is moved and the correlation calculation is performed is referred to as the parallax calculation direction. By setting the parallax calculation direction to be the same direction as the pupil division direction, the amount of parallax generated according to the subject distance between the A image and the B image can be correctly calculated. For the calculation of the correlation values, a common calculation method such as SAD (Sum of Absolute Difference) or SSD (Sum of Squared Difference) can be used.

Next, a parallax amount is calculated from the obtained correlation values. The parallax amount can be calculated using an existing method. For example, the parallax amount can be calculated by extracting the data string of the correlation value corresponding to the movement amount by which the highest correlation is obtained among the correlation values and movement amounts in the vicinity thereof, and estimating the movement amount by which the correlation is highest with sub-pixel precision by a known interpolation method.

The calculated parallax amount can be converted into a defocus amount or a subject distance by a known method. The conversion from the parallax amount to the defocus amount can be calculated from a geometric relationship using the baseline length. Conversion from a defocus amount to the subject distance may be performed using an imaging relationship of the imaging optical system 104. Alternatively, conversion into a defocus amount or a subject distance may be achieved by multiplying the amount of parallax by a predetermined conversion coefficient. It is possible to calculate distance information for a target pixel by such a method, and a parallax image, a defocus image, or a distance image can be obtained by performing the above-described calculation for each pixel.

In step S308 ("evaluation region determination"), the calculation processing unit 106 determines an evaluation region for detecting a position of the projection portion 111 in the pattern projection image. First, a standard deviation is calculated for each partial region in the distance image. Next, a region in which the standard deviation is smaller than a predetermined base value is selected as an evaluation region among the partial regions. As a result, a region in which the amount of change in distance is smaller than a predetermined threshold can be determined as an evaluation region.

In step S303 ("projection portion position detection"), when the position of the projection portion is detected using the pattern projection image as in step S303 of FIG. 3, the position detection for the projection portion 111 is performed using the image of the evaluation region determined by step S308.

In step S304 ("illuminance portion position detection") and step S305 ("shape calculation"), the position of the illuminance portion 110 is detected and the shape information is calculated in the same manner as in FIG. 3.

When the light pattern is projected onto a boundary of an object or an unevenness of an object where there are different distances, the shape of the light pattern is distorted by the change in distance, so that the direction cannot be correctly detected. By using the distance information and detecting the position of the projection portion using an image of a region in which the amount of change of the distance is smaller than a predetermined threshold, it is possible to perform detection of the direction of the pattern projection image with high precision even when a plurality of objects at different distances or objects with large unevenness exist in the capturing region.

By the shape information acquisition processing described above, even when the illumination device 101 is installed at a position that is shifted from the base attachment position, the position of each illuminance portion 110 can be detected with high precision, and more highly precise shape information can be acquired.

Note, although the method of determining the evaluation region using the distance image has been described in the first embodiment, a parallax image or a defocus image may be used instead of the distance image. Since the amount of parallax and the amount of defocus vary according to the distance, a region having a small distance variation may be detected using the parallax image and the defocus image and determined as an evaluation region. An equivalent effect can be achieved.

(Shape Calculation Method Using Shadow Information)

A shadow region may be detected using photometric images, and shape information such as relative distance information representing a relative distance relationship between objects or boundary information representing regions in which the distance greatly changes may be acquired. When objects having a difference in distance are illuminated, a shadow region which is not illuminated since it is blocked by a closer object is generated. Such a region is a region of a low luminance that is less than or equal to a predetermined luminance value in the captured image. In an image acquired by a one-way illumination, since the subject reflectance is low, shadow regions cannot be discriminated from low luminance regions.

Therefore, using the photometric images acquired by performing illumination from a plurality of directions, a pixel region in which the amount of change in the luminance value according to a change in the direction is larger than a predetermined threshold is detected as a shadow region. As a result, it is possible to separately detect low luminance regions and shadow regions. From detected shadow regions and the illumination direction, a closer object region to the image capture device 103 and a farther region can be detected, and relative distance information can be obtained. In addition, it is possible to detect a boundary region between a shadow region and the object region closer than the shadow region, and to obtain boundary information. By detecting the illumination direction by the method described above, shape information can be acquired with higher precision. Shape information in the present embodiment is normal information of a subject, absolute distance information from a predetermined base position, or relative distance information within a subject region.

(Configuration of One Illuminance Portion)

Figure 6A:
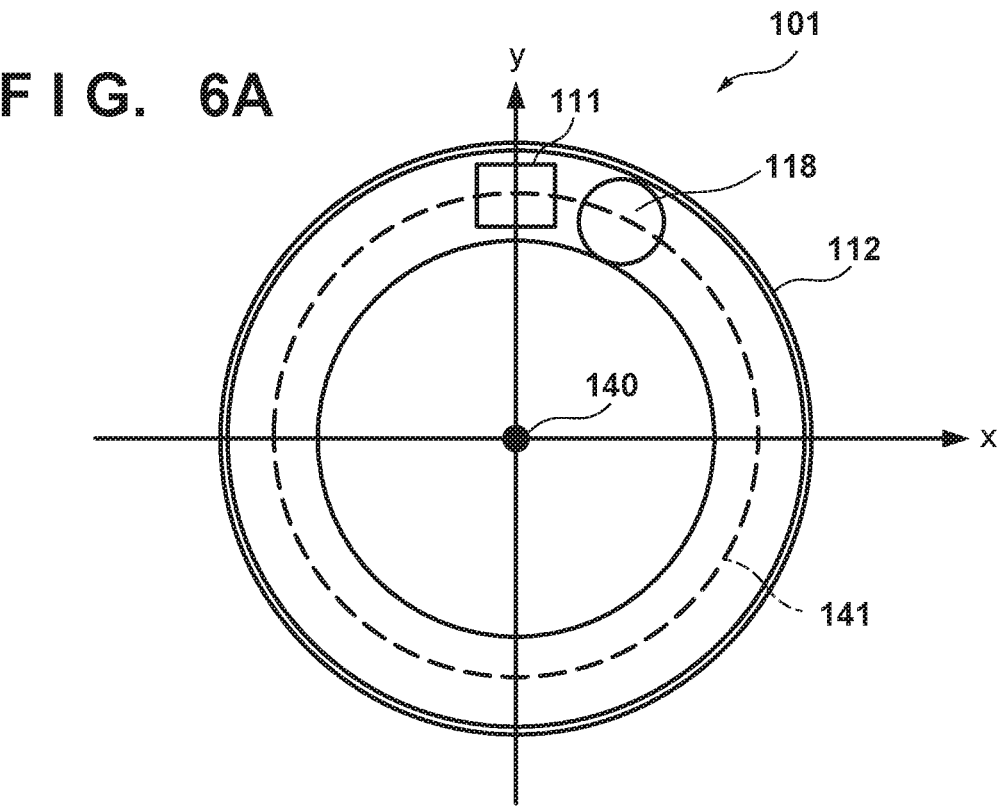
FIGS. 6A to 6C are schematic diagrams illustrating an example of another shape information acquisition process of the first embodiment.
Figure 6B:
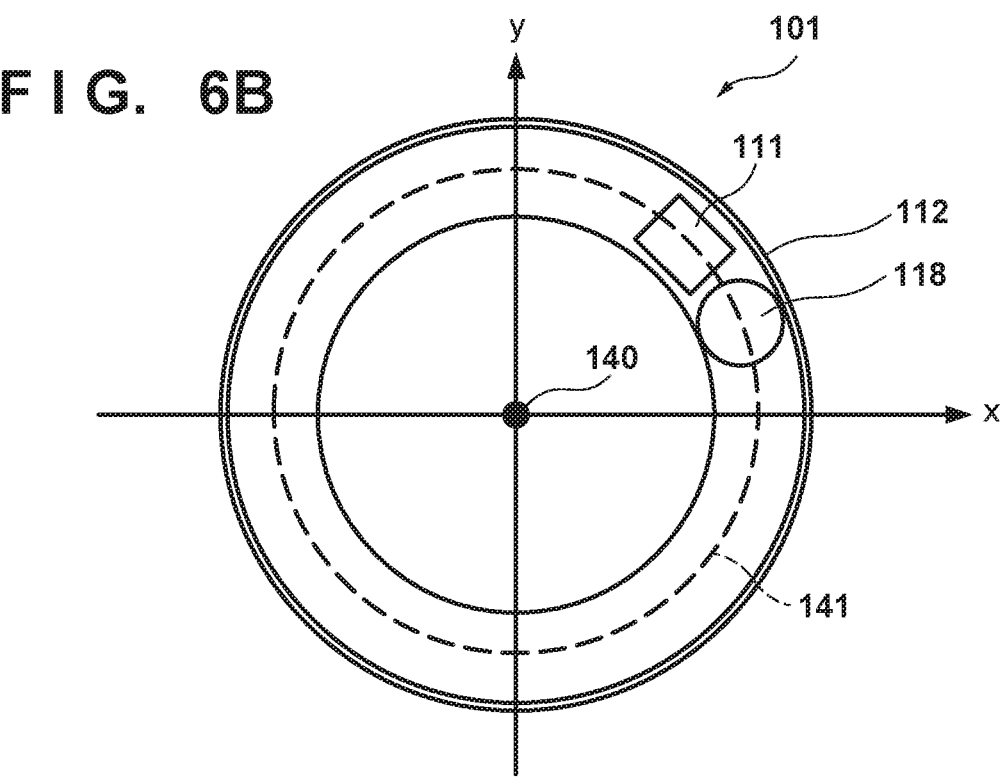

In the present embodiment, an example in which the illumination device 101 is configured by a plurality of illuminance portions 110 is illustrated, but a single illuminance portion may be configured. FIGS. 6A and 6B illustrate an exemplary configuration of the illumination device 101 with a single illuminance portion 118.

The illuminance portion 118 is disposed at a predetermined position of the attachment portion 112. As illustrated in FIGS. 6A and 6B, the illumination device 101 is configured such that the illuminance portion 110 and the projection portion 111 can be manually or automatically rotated about the optical axis 140 of the image capture device 103. A positional relationship between the illuminance portion 110 and the projection portion 111 is a positional relationship in the circumference 141 equidistant from the optical axis 140 in a plane perpendicular to the optical axis 140 of the imaging optical system 104 as in FIGS. 6A to 6B.

Figure 6C:
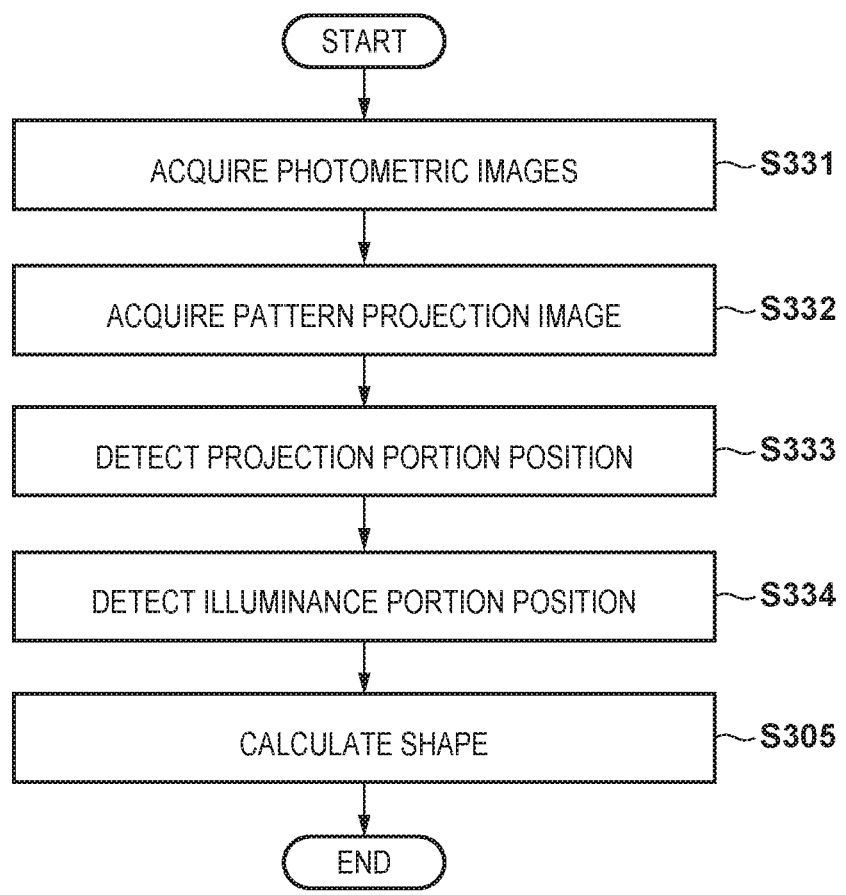

FIG. 6C illustrates a process of acquiring shape information when the illumination device 101 is configured by a single illuminance portion.

In step S331 ("photometric image acquisition"), the control unit 108 controls the illuminance portion 110 and the image capture device 103 to acquire an image by performing illumination and capturing with the illumination device 101 at an arbitrary position. Here, illumination and capturing are performed by changing the position of the illuminance portion 118 while rotating the position of the illumination device 101. Photometric images are acquired by changing the position of the illuminance portion and then performing illumination and capturing a plurality of times as necessary.

In step S332 ("pattern projection image acquisition"), a pattern projection image is acquired by the control unit 108 controlling the projection portion 111 and the image capture device 103 and capturing the subject in a state in which a light pattern is projected thereon. Here, by rotations of the illumination device 101, the photometric images are acquired in step S331, and the projection portion 111 projects the light pattern at the respective rotational positions of the illuminance portion 110, and thereby projection images are acquired.

In step S333 ("projection portion position detection"), the calculation processing unit 106 detects the position of the projection portion at each rotation position using the pattern projection image at each rotation position of the illuminance portion 110. The position detection method of the projection portion 111 can be any of the methods described with reference to FIG. 3 and FIGS. 5A and 5B.

In step S334 ("illuminance portion position detection"), the calculation processing unit 106 calculates the position of the illuminance portion 110 at each rotation position based on the position of the projection portion 111 detected at each rotation position of the illuminance portion 110 and the basis position information. The method of detecting the position of the illuminance portion 110 at the respective rotational positions is similar to that described with reference to FIG. 3 and FIGS. 5A and 5B.

In step S305 ("shape calculation"), the calculation processing unit 106 calculates the shape information by the method described in FIG. 3 and FIGS. 5A and 5B.

According to the shape information acquisition processing described above, even when the illumination device 101 is at a position shifted from the base attachment position, information on each rotation position of the illuminance portion 110 can be acquired, and highly precise shape information can be acquired. In addition, since the number of illuminance portions 110 can be reduced, the number of components of the illumination device 101 can be reduced, and the device can be configured at a lower cost.

Second Embodiment

Next, a second embodiment will be described.
<Device Configuration>
First, with reference to FIGS. 7A to 7E, the configuration and function of a shape information acquisition apparatus according to the second embodiment will be described.

In a shape information acquisition apparatus 200 according to the second embodiment, the image capture device 103 includes the imaging optical system 104, the image sensor 105, the calculation processing unit 106, and the built-in memory 107. A polarization control device 401 and the image capture device 103 are connected to the control unit 108 and receive control such as synchronization.

Figure 7A:
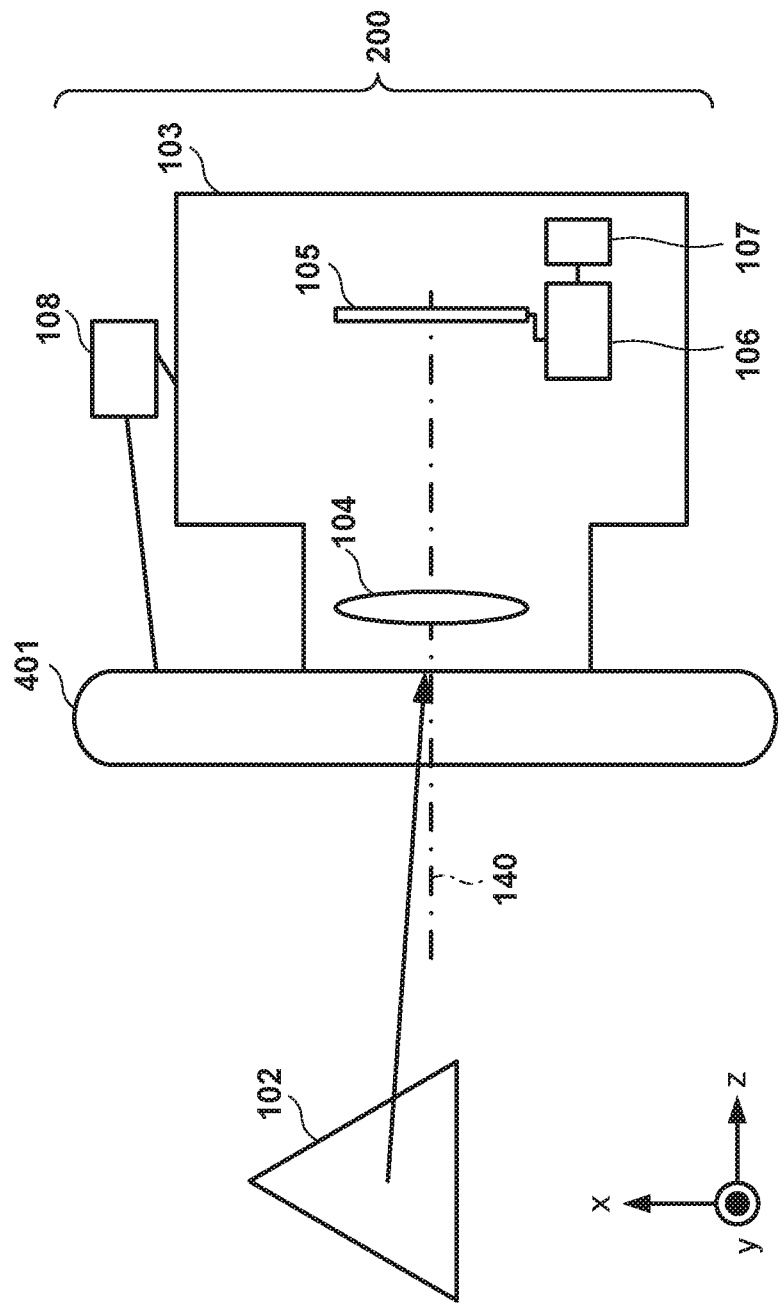
FIGS. 7A to 7E are block diagrams schematically illustrating an exemplary configuration of a device according to a second embodiment.
Figure 7B:
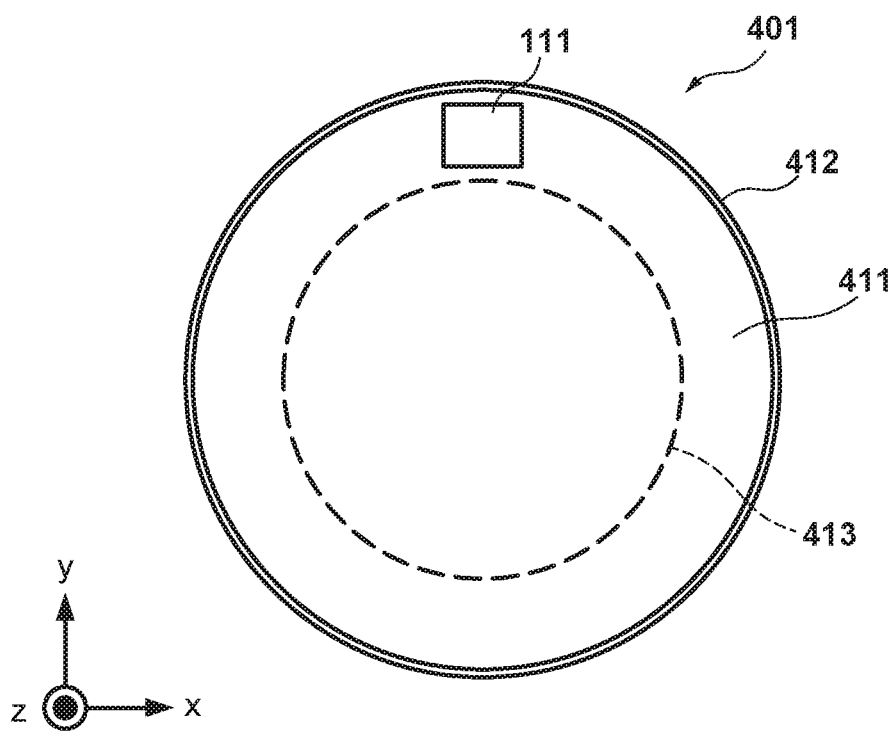

The polarization control device 401 includes a polarization element 411, a projection portion 111, and an attachment portion 412 for attaching the polarization element 411 and the projection portion 111 to the image capture device 103. The polarization element 411 and the projection portion 111 are arranged in a plane perpendicular to the optical axis 140 of the imaging optical system 104 of the image capture device 103. In FIG. 7B, reference numeral 413 denotes an outer shape of the imaging optical system 104.

Figure 7C:
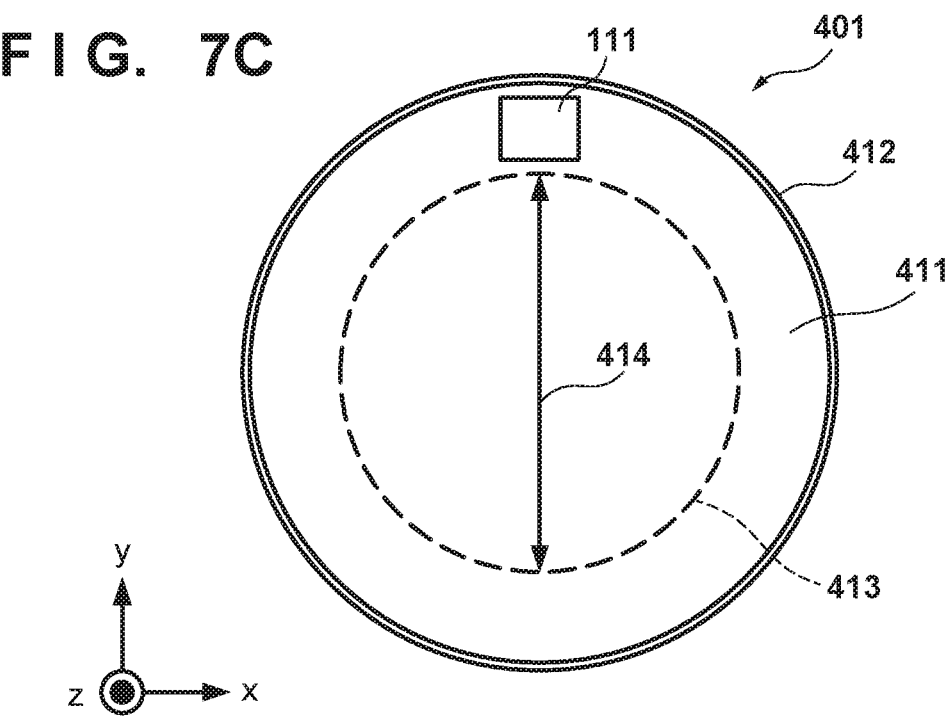
Figure 7D:
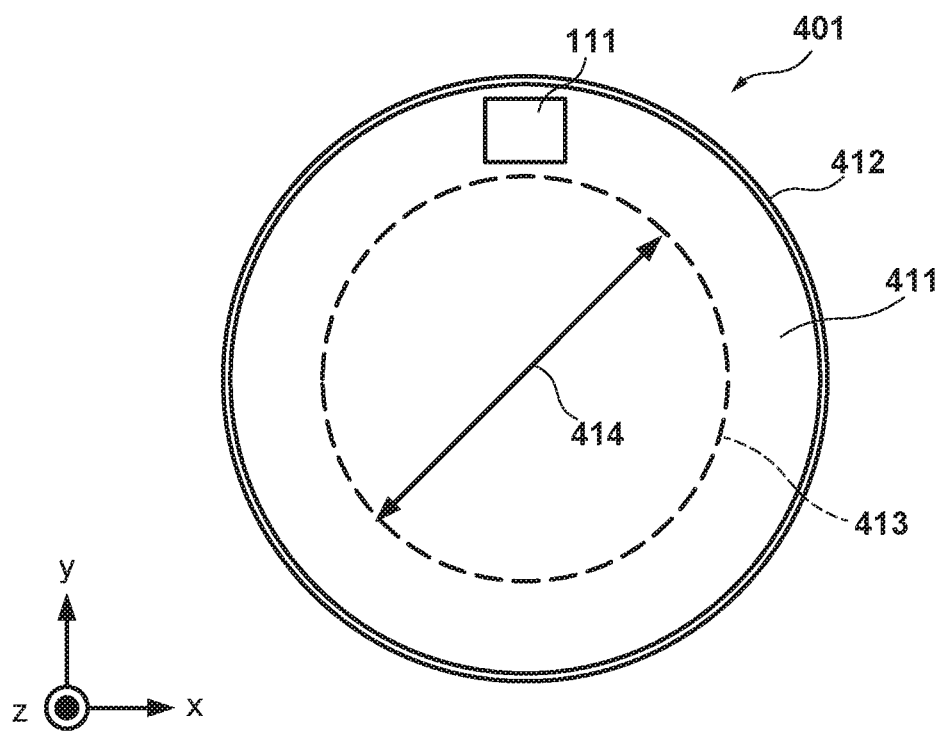
Figure 7E:
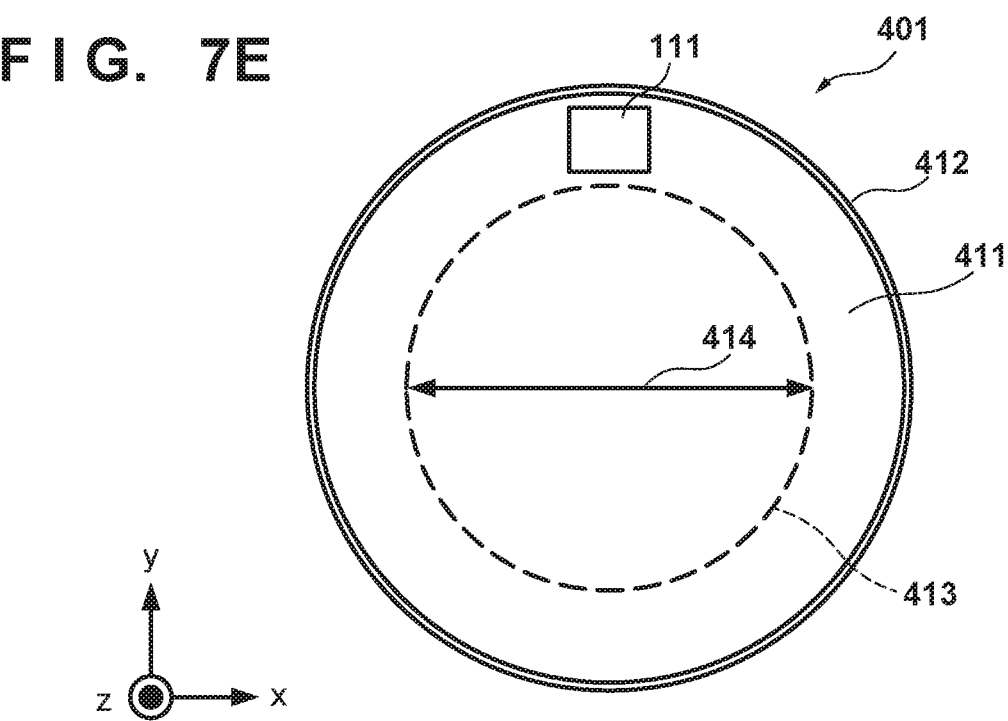

The polarization element 411 is an element that transmits light parallel to its polarization axis or transmission axis and stops transmission of light in directions other than the polarization axis or the transmission axis, and is an element whose transmission axis direction is variable. The polarization element 411 includes, for example, a ¼ wavelength phase plate, a VA (Vertical Alignment) type liquid crystal element, and a polarizing plate. The ¼ wavelength phase plate and the polarizing plate are arranged such that the slow axis or the fast axis of the ¼ wavelength phase plate is parallel to the transmission axis of the polarizing plate. The polarization control device 401 includes a driving unit (not illustrated), and applies a voltage to the liquid crystal element. By changing the applied voltage by the driving unit, the alignment direction of the liquid crystal molecules is changed, and the direction of the transmission axis of the polarization element 411 can be changed. FIGS. 7C to 7E illustrate directions of the transmission axis, and increasing or decreasing the applied voltages changes the direction of the transmission axis 414 passing through the polarization element as illustrated.

The attachment portion 412 is a member that attaches the polarization element 411 and the projection portion 111 to the image capture device 103 or capture assisting equipment (not shown) such as a tripod or the like. The polarization element 411 and the illumination device may be configured to be detachable from the attachment portion 412. The attachment portion 412 may be configured to be detachable with respect to the image capture device 103 or the capture assisting equipment. The transmission axis direction of the polarization element 411 at a time when a predetermined voltage is applied and the position information of the projection portion are known, and the voltage at this time is referred to as a base voltage, the direction is referred to as a base direction, and the position is referred to as a base position. The attachment position of the polarization control device 401 is referred to as a base attachment position. This base information (the base voltage, base direction, and base position) is recorded in the built-in memory 107 or a memory provided in the polarization control device 401.

<Shape Information Acquisition Processing>

Figure 8:
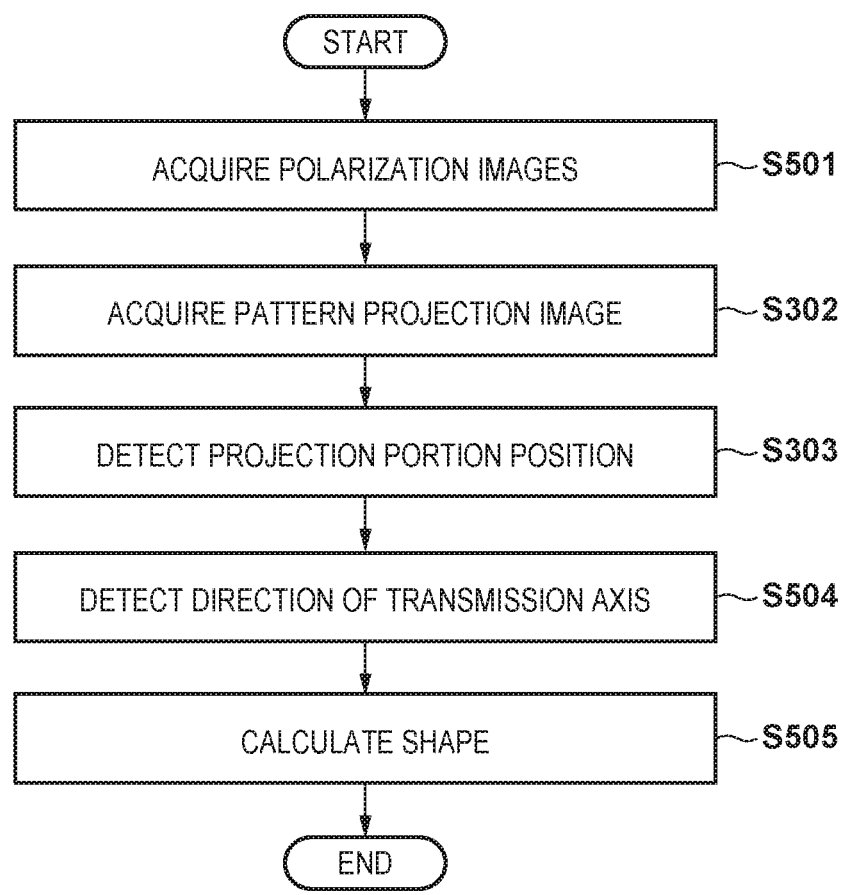
FIG. 8 is a flowchart illustrating an example of shape information acquisition process according to the second embodiment.

Next, with reference to FIG. 8, shape information acquisition processing of the second embodiment will be described.

In step S501 ("polarization image acquisition"), the control unit 108 controls the polarization control device 401 and the image capture device 103 to acquire polarization images by capturing the subject image light as a predetermined transmission axis. At this time, a predetermined voltage is applied to the polarization element 411 by the driving unit (not illustrated) to set the direction of the transmission axis and perform capture. Next, the applied voltage is changed, and capture is performed with another transmission axis. A plurality of polarization images can be acquired by capturing the subject image light with different transmission axes. The polarization images are stored in the built-in memory 107.

In step S302 ("pattern projection image acquisition") and step S303 ("projection portion position detection"), as in FIG. 3, acquisition of the pattern projection image and detection of the position of the projection portion 111 are performed.

In step S504 ("transmission axis direction detection"), the calculation processing unit 106 detects the direction of the transmission axis of the polarization element 411 for each of the voltages applied to the polarization element 411 based on the position information of the projection portion 111 obtained in step S303. Since the base direction of the transmission axis at the base voltage and the base position of the projection portion 111 are known, the difference with respect to the base direction of the transmission axis can be obtained from the difference between the position of the projection portion 111 and the base position, and the difference between the applied voltage and the base voltage.

In step S505 ("shape information calculation"), the calculation processing unit 106 calculates the shape information by a known method. Based on the polarization images acquired in step S501 and the transmission axis direction information detected in step S504, surface normal information, which is shape information, can be calculated by a known method. When non-polarized light enters the object, the ratio of S-polarized light and P-polarized light included in the reflected light changes according to the surface normal of the object. By analyzing the ratio of S-polarized light and P-polarized light from the acquired polarization image, surface normal information of the subject can be calculated.

By the shape information acquisition processing described above, even when the polarization control device 401 is installed at a position that is shifted from the base attachment position, the transmission axis of the polarization element 411 can be detected with high precision, and more highly precise shape information can be acquired.

Note that although an example in which the polarization element 411 is formed using a VA liquid phase element is described in this embodiment, configuration may be taken such that another phase plate or liquid crystal element is used.

Although an example in which the transmission state of light that is transmitted through the polarization element 411 is changed by applying a voltage to a liquid crystal element has been described, the polarization element 411 or the liquid crystal element may be configured to be mechanically rotated. In such a case, the polarization element 411 or the liquid crystal element may be automatically or manually rotated. As described above, even when the polarization control device 401 is set at a different position from the base attachment position, the direction of the transmission axis of the polarization element 411 can be detected, and highly precise shape information can be acquired.

Third Embodiment

Next, a third embodiment will be described.

In the first embodiment, the shape information of the subject is calculated by the image capture device 103, but in the third embodiment, the shape information of the subject is calculated by using an image processing device 600 provided separately from the image capture device 103.

Figure 9:
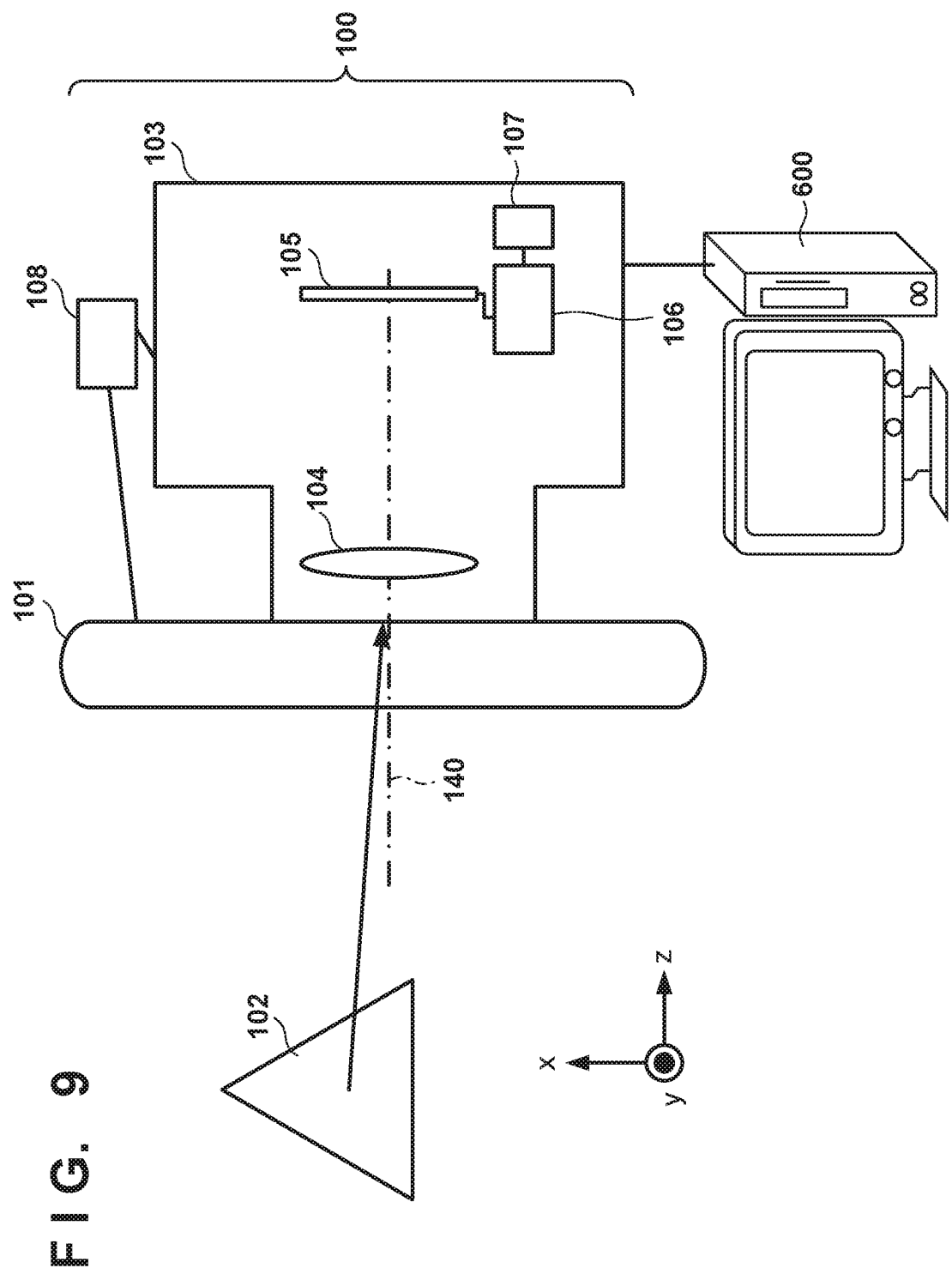
FIG. 9 is a block diagram schematically illustrating an exemplary configuration of a device according to a third embodiment.

Hereinafter, with reference to FIG. 9, a configuration and functions of an image processing device of the third embodiment will be described.

The image processing device 600 according to the third embodiment is an information processing device such as a personal computer (PC). The image processing device 600 is connected to the image capture device 103 so as to be able to communicate with the image capture device 103 by wire or wirelessly, and the image processing device 600 can receive data of photometric images and a pattern projection image acquired by the image capture device 103. The image processing device 600 has a calculation processing unit that performs the processing of step S303 to step S305 of FIG. 3. Photometric image data and pattern projection image data acquired in step S301 and step S302 are transmitted to the image processing device 600 by wire or wirelessly, and the processing is performed in the calculation processing unit, whereby the shape information can be acquired. Even in such a configuration, similarly to the first embodiment, the positions of the projection portion and the illuminance portion can be detected with high precision, and shape information can be acquired with high precision.

The base position information of the projection portion and the illuminance portion may be recorded together with the image data as additional information of the photometric images or the pattern projection image. Alternatively, the processing of step S304 of FIG. 3 may be performed by the calculation processing unit 106 of the image capture device 103, and the obtained positional information of the illuminance portion may be recorded together with the image data as additional information of the photometric images or the pattern projection image. The base position information may be stored in advance in a storage device in the image processing device 600. Alternatively, this base position information or the position information of each illuminance portion may be stored in another storage device connected via the Internet, and data may be read from the other storage device and used when calculating the shape information. The shape information can be calculated using the image data and the position information when the shape calculation is performed by the calculation processing unit of the image processing device 600.

OTHER EMBODIMENTS

It is also advantageous that the polarization control device 401 be configured by the calculation processing unit 106 provided in the image capture device 103 from the viewpoint of device miniaturization.

The projection portion 111 may use an LD (Laser Diode) as a light source. A reflective LCOS, a transmissive LCOS, or a DMD may be used. The cycle of the projection pattern can be changed as needed according to the size and distance of the subject, and the distance measurement can be performed with higher precision according to the situation. It is advantageous that the wavelength of the light source of the projection portion 111 be that of white light including the entire visible range because the effect of reflectance correction can be obtained regardless of the spectral reflectance of the subject in the present embodiment. The light source of the projection portion 111 is configured by three colors (R, G, and B), which coincides with the color filter transmission band of the image capture device 103, and is suitable from the viewpoint of the light utilization efficiency with respect to the used energy. It is advantageous that the light source of the projection portion 111 be an infrared (IR) region, and that capturing be performed using a capturing device including a color filter and an image sensor having a transmission band and a light receiving sensitivity corresponding thereto, because it is possible to simultaneously capture an image for viewing using an RGB band. In particular, when the IR wavelength band is between 800 nm and 1100 nm, Si can be used for the photoelectric conversion portion, and by changing the arrangement of the color filters, an RGB viewing image and an IR distance measurement image can be acquired by one image sensor, which is advantageous.

The image capture device 103 may be configured by a stereo camera including two or more optical systems and an image sensor corresponding to each optical system. This is advantageous from the viewpoint of improving the degree of freedom in designing the base length and improving the distance measurement resolution. Alternatively, the illumination device 101 or the polarization control device 401 and the image capture device 103 may be configured separately from each other.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-231940, filed Dec. 11, 2018 which is hereby incorporated by reference herein in its entirety.

What is claimed is:
1. A shape information acquisition apparatus, comprising:
a memory and at least one processor to perform operations:
acquiring photometric images for which a subject is illuminated from different directions by an illuminance portion, a pattern projection image for which a predetermined light pattern is projected onto the subject by a projection portion of which a relative position is variable with respect to the subject, and base position information on a relationship between a position of the projection portion and a position of the illuminance portion;
detecting a position of the projection portion based on a direction of a line pattern in the pattern projection image, which changes according to the position of the projection portion;
detecting a position of the illuminance portion based on a difference between a position of the projection portion and the base position information; and
calculating shape information for the subject based on the photometric images and the position of the illuminance portion.
2. The apparatus according to claim 1, wherein the shape information acquisition apparatus comprises an image capture device and an illumination device,
the image capture device captures the photometric images for which the subject is illuminated from different directions by the illuminance portion and the pattern projection image for which the predetermined light pattern is projected onto the subject by the projection portion.

3. The apparatus according to claim 2, wherein the illumination device has the illuminance portion which is capable of illuminating a subject from the plurality of different directions, and the projection portion which is capable of projecting a predetermined light pattern onto the subject.

4. The apparatus according to claim 3, wherein the illuminance portion and the projection portion are arranged on a circumference equidistant from an optical axis in a plane perpendicular to an optical axis of the image capture device.

5. The apparatus according to claim 3, wherein the illumination device has an attachment portion for attaching the illuminance portion and the projection portion to the image capture device.

6. The apparatus according to claim 2, wherein the illuminance portion includes a plurality of light sources arranged at different positions, the image capture device acquires the photometric images by performing capture in states in which the plurality of light sources are individually turned on, and the detection unit detects a position of the plurality of light sources as a position of the illuminance portion.

7. The apparatus according to claim 2, wherein the illuminance portion is arranged such that a single light source is rotatable about the optical axis of the image capture device, and the image capture device acquires the photometric images by performing capture after changing the position of the light source.

8. The apparatus according to claim 1, wherein the predetermined light pattern is a line pattern in which a high luminance region exceeding a predetermined luminance value and a low luminance region less than or equal to the predetermined luminance value are repeated in a predetermined direction.

9. The apparatus according to claim 8, wherein the detection unit extracts a region in which a linearity of the line pattern in the pattern projection image is within a predetermined error range, and detects the position of the projection portion using an image of the extracted region.

10. The apparatus according to claim 8, wherein the detection unit detects the position of the projection portion by detecting the direction in which the line pattern extends.

11. The apparatus according to claim 1, wherein the detection unit relatively rotates a base image and the pattern projection image to calculate a correlation value, thereby detecting a position of the projection portion.

12. The apparatus according to claim 1, wherein the detection unit calculates distance information of a subject using the pattern projection image, and detects the position of the projection portion using an image of a region in which an amount of change of distance is smaller than a predetermined threshold.

13. The apparatus according to claim 12, wherein the acquiring unit acquires a parallax image based on a luminous flux passing through different pupil regions of an optical system, and the detection unit calculates the distance information by a correlation calculation for the parallax image.

14. The apparatus according to claim 1, wherein the shape calculation unit calculates the shape information by a photometric stereo method using the photometric images.

15. The apparatus according to claim 1, wherein the shape calculation unit calculates shape information of the subject by detecting, as a shadow region, a region in which a change in luminance is larger than a predetermined value among a plurality of the photometric images.

16. A shape information acquisition apparatus comprising:
a memory and at least one processor to perform operations:
acquiring polarization images for which a direction of transmission through a polarization element differs, a pattern projection image obtained by projecting a predetermined light pattern onto a subject by a projection portion of which a relative position is variable with respect to the subject, and base information on a relationship between a position of the projection portion and a direction of transmission of the polarization element;
detecting a position of the projection portion based on a direction of a line pattern in the pattern projection image, which changes according to the position of the projection portion;
detecting the direction of transmission based on a difference between a position of the projection portion and the base information; and
calculating shape information for the subject based on the polarization images and the directions of transmission.

17. The apparatus according to claim 16, wherein the shape information acquisition apparatus comprises an image capture device and a polarization control device,
the image capture device captures the polarization images for which a direction of transmission through the polarization element differs and the pattern projection image for which the predetermined light pattern is projected onto the subject by the projection portion.

18. The apparatus according to claim 17, wherein the polarization control device has the polarization element for which a direction in which light of a subject is transmitted is variable, and the projection portion capable of projecting a predetermined light pattern onto the subject.

19. The apparatus according to claim 18, wherein the polarization element and the projection portion are arranged in a plane perpendicular to an optical axis of an optical system of the image capture device, and the polarization control unit has an attachment portion for attaching the polarization element and the projection portion to the image capture device.

20. A shape information acquisition method of an apparatus in which photometric images for which a subject is illuminated from different directions by an illuminance portion, a pattern projection image for which a predetermined light pattern is projected onto the subject by a projection portion of which a relative position is variable with respect to the subject, and base position information on a relationship between a position of the projection portion and a position of the illuminance portion are acquired, the method comprising:
detecting a position of the projection portion based on a direction of a line pattern in the pattern projection image, which changes according to the position of the projection portion;

detecting a position of the illuminance portion based on a difference between a position of the projection portion and the base position information; and calculating shape information for the subject based on the photometric images and the position of the illuminance portion.

21. A shape information acquisition method of an apparatus in which polarization images having different directions of transmission through a polarization element, a pattern projection image obtained by projecting a predetermined light pattern onto a subject by a projection portion of which a relative position is variable with respect to the subject, and base information on a relationship between a position of the projection portion and a direction of transmission of the polarization element are acquired, the method comprising:

detecting a position of the projection portion based on a direction of a line pattern in the pattern projection image, which changes according to the position of the projection portion;

detecting a direction of the transmission based on a difference between a position of the projection portion and the base information; and calculating shape information for the subject based on the polarization image and the direction of the transmission.

22. A non-transitory computer-readable storage medium storing a program that causes a computer to execute a shape information acquisition method of an apparatus in which photometric images for which a subject is illuminated from different directions by an illuminance portion, a pattern projection image for which a predetermined light pattern is projected onto the subject by a projection portion of which a relative position is variable with respect to the subject, and base position information on a relationship between a position of the projection portion and a position of the illuminance portion are acquired, the method comprising:

detecting a position of the projection portion based on a direction of a line pattern in the pattern projection image, which changes according to the position of the projection portion;

detecting a position of the illuminance portion based on a difference between a position of the projection portion and the base position information; and calculating shape information for the subject based on the photometric images and the position of the illuminance portion.

23. A non-transitory computer-readable storage medium storing a program that causes a computer to execute a shape information acquisition method of an apparatus in which polarization images having different directions of transmission through a polarization element, a pattern projection image obtained by projecting a predetermined light pattern onto a subject by a projection portion of which a relative position is variable with respect to the subject, and base information on a relationship between a position of the projection portion and a direction of transmission of the polarization element are acquired, the method comprising:

detecting a position of the projection portion based on a direction of a line pattern in the pattern projection image, which changes according to the position of the projection portion;

detecting a direction of the transmission based on a difference between a position of the projection portion and the base information; and calculating shape information for the subject based on the polarization image and the direction of the transmission.

24. An image capturing apparatus comprising:

an image capturing unit;

an illumination unit having an illuminance portion which is capable of illuminating a subject from a plurality of different directions, and a projection portion which is capable of projecting a predetermined light pattern onto the subject and of which a relative position is variable with respect to the subject;

a memory and at least one processor to perform operations units:

recording base position information on a relationship between the position of the illuminance portion and the position of the projection portion; and outputting photometric images for which a subject is illuminated from different directions by the illuminance portion, a pattern projection image for which the predetermined light pattern is projected onto the subject by the projection portion, and base position information together.

* * * * *